Patented May 11, 1943

2,318,803

UNITED STATES PATENT OFFICE 2,318,803

MARKING COMPOSITION

Wallace K. Schneider and George W. Seagren, Pittsburgh, Pa., assignors to Stoner-Mudge, Inc., Pittsburgh, Pa., a corporation of Pennsylvania No Drawing. Application March 18, 1942, Serial No. 435,132

6 Claims. (Cl. 106—19)

This invention relates to a composition for marking metal ingots, castings, rolled sheets and like metal objects which have to be reheated at or above 500° F. in the process of fabricating to finished articles. It relates specifically to a marking composition comprising an opaque pigment or mixture of pigments combined with a fusible inorganic "flux" to be later described, and a cellulose ether binder or vehicle stable at ordinary temperatures but volatile at temperatures of 500° F. and up.

In the manufacture of fabricated metal articles it is necessary to start with the particular metal or alloy in ingot or "pig" form, and to work it into the particular condition and shape that is desired by first reheating the ingot to a temperature substantially above that at which the ingot is stored. While ordinary paints or stenciling inks serve readily to mark a particular ingot or incompletely fabricated metal billet, and thus to enable its ready identification during storage, such markings are invariably destroyed during the first reheating operation to which the billet or ingot is subjected. Accordingly, there is difficulty in identifying particular "heats" and/or special ingots after the reheating operations are begun.

It is an object of our invention to provide a marking or stenciling composition which may be applied to the ingot or other crude casting and which will result in an identifying mark which remains intact and legible even during and after reheating operations at temperatures exceeding 500° F. It is a further object of our invention to provide a pigmented composition capable of producing marks on metal objects which will withstand continued exposure to temperatures in excess of 500° F. without losing integrity and legibility.

These objects may be attained, and our invention lies, in the use of a marking composition comprising (1) an opaque pigment or mixture of pigments combined in the manner familiar to the ceramic art with a fusible inorganc flux or low-melting glass derived by melting together certain metallic oxides such as silicon dioxide, boron trioxide, lead oxide, potassium oxide, sodium oxide, and diverse other metallic oxides, and thereafter powdering to a colored "frit" or "color", and (2) a cellulose ether binder which serves as a matrix for the resulting "colored frit."

It will be understood that the term "pigment" as hereinafter employed in the specification and claims will be inclusive of single pigments and of mixtures of pigments; they are usually metal oxides of high melting point, typically iron oxide, cadmium oxide, cobalt oxide, chromium oxide and the like, and/or certain metals of which selenium and gold are typical.

The term "flux" is familiar to the ceramic art, and is used to designate a low-melting glass, usually a complex of lead, boron and silica modified in its fusing properties by the proportions of these oxides and the addition of other particular materials in a manner familiar to the ceramic art.

The term "colored frit" refers to a combination of pigment as defined above and flux, melted together and thereafter quenched by pouring into water; the shattered fragments resulting are then further ground into a fine homogeneous powder. It is this combination of pigment and flux, hereinafter termed for convenience and clarity, a "colored frit" which is component 1 of our marking composition.

We have specified as component 2 of our marking composition, a cellulose ether binder stable at ordinary temperatures but volatile at temperatures exceeding 500° F. And by the term "volatile" we mean that at tempertures exceeding 500° F. the binder disappears completely without evidence of burning and without the intermediate deposition of carbon or carbonaceous residues. And we find specifically suited to our purposes certain cellulose ethers, of which methyl cellulose, ethyl cellulose, and benzyl cellulose are typical.

The binder material which is our component 2 is selected from a class of cellulose derivatives known as cellulose ethers. These resinous materials are well known, and are derived from the interetherification of cellulose and monohydroxy alcohols, of which methyl alcohol, ethyl alcohol, the propyl alcohols, the butyl alcohols, the amyl alcohols, the hexyl alcohols, cyclohexyl alcohol and its alkyl homologs, and benzyl alcohol together with its alkyl and aryl homologs are typical. And we find particularly suited to our purposes those cellulose ethers having at least 1 ether group per anhydro-glucose unit; we prefer those ethers having an alkoxy content in the range of 45–55% of complete etherification of the basic anhydroglucose unit. The term "alkoxy" will be understood to be inclusive of both alkyl and arylalkyl ether groups.

The preparation of our marking compositions offers no difficulties. Thus, we may grind the colored frit which is our component 1 together with the cellulose ether (component 2) on a roll mill, a pebble mill, a steel ball mill, or any other milling device. If desired, we may incorporate variable amounts of a softening agent which may be a plasticizer such as butyl stearate, dibutyl tartrate, diethyl phthalate, dibutyl phthalate, methyl cellosolve phthalate, cyclohexyl adipate, alkyl sulfonamides, triphenyl phosphate, tricresyl phosphate, linseed oil, soyabean oil, perilla oil or other drying or semidrying oils, and chlorinated naphthalenes or bi-phenyls. Alternatively, we may incorporate as a softening agent a high-boiling organic solvent of which isophorone, dipentene, turpentine, cellosolve acetate, butyl lactate, cyclohexanyl acetate, diacetone alcohol, high-boiling mineral spirits, and other cellulose ether solvents and swelling agents boiling substantially above 275° F. are typical.

The resulting granular to rubbery homogeneous compositions may be hot pressed or pressure molded or extrusion molded into bars, rods, or other suitable shapes which can be used directly for marking or writing on the surface of the metal object as with a pencil or crayon. Alternatively, the compositions may be dispersed in organic solvents, such as mixtures of aliphatic ketones, esters and hydrocarbons, and applied as desired by a brush or suitable stenciling, lettering, or numbering device. Upon evaporation of the solvent, there results a permanent mark or identifying symbol in which the colored frit imparts contrasting color and opacity, and the cellulose ether acts as an adhesive binder.

When, thereafter, the so marked ingot or sheet is brought to a temperature exceeding 500° F., and which will ordinarily lie in the range of 800 to 950° F. for aluminum and its alloys, and in the range of 1100 to 1300° F. for ferrous metals, the cellulose ether binder volatilizes away, without the intermediate deposition of carbon or carbonaceous residues; the colored frit fuses and binds itself to the heated metal surface, and the resulting fused-on identifying mark is permanent, tightly adhered and capable of withstanding normal handling and abrasion without rubbing off or becoming illegible.

The following examples will illustrate the marking compositions of our invention, it being understood that we are not limited to the specific materials, nor to the proportions therein recited. All the percentages are on a weight basis.

*Example 1*

|  | Per cent |
|---|---|
| Ethyl cellulose, medium viscosity, 47.8% ethoxy content | 46.4 |
| Colored frit fusing at 800° F | 46.4 |
| Mixed petroleum hydrocarbons boiling between 400 and 500° F | 7.2 |
|  | 100.0 |

*Example 2*

|  | Per cent |
|---|---|
| Butyl cellulose, low viscosity, 35% butoxy content | 19.0 |
| Colored frit fusing at 550° F | 76.2 |
| Dimethyl phthalate | 4.8 |
|  | 100.0 |

*Example 3*

|  | Per cent |
|---|---|
| Benzyl cellulose, high viscosity, 40% benzoxy content | 16.7 |
| Colored frit fusing at 1000° F | 66.7 |
| Tricresyl phosphate | 16.6 |
|  | 100.0 |

The above illustrative compositions are granular to rubbery homogeneous mixes suitable for hot pressing or extruding into pencil-like sticks for use in marking directly on the desired ingot or sheet surface, particularly if the surface be already hot. Thus, for example, a crayon molded from the composition of Example 1 was used to mark an ingot of aluminum alloy immediately after the latter's removal from the mold, at which time the surface temperature was approximately 400° F. The ingot was then allowed to cool to room temperature and stored. Subsequently, the marked ingot was placed in an annealing oven and held at a temperature of 950° F. for 12 hours. Upon removal from the oven, the ingot was found to bear its identifying mark in completely intact and legible form. The colored frit had fused to the ingot surface, and the cellulose ether had, of course been volatilized away, during the first minutes of exposure in the annealing oven.

*Example 4*

|  | Per cent |
|---|---|
| Ethyl cellulose, medium viscosity 46% ethoxy content | 6.7 |
| Colored frit fusing at 800° F | 13.4 |
| Petroleum hydrocarbon cut boiling between 400–480° F | 18.1 |
| Isophorone | 22.1 |
| Toluol | 39.7 |
|  | 100.0 |

The composition of Example 4 serves to illustrate the use of our marking composition, dispersed in a volatile organic solvent mixture to furnish a lacquer-like composition capable of being applied by brushing—as through a stencil card, for example. After evaporation of the solvents the resulting mark has all of the desirable characteristics previously described.

Now, having described our invention, and having shown the advantages intendent on its use, we claim as our invention:

1. A marking material adapted to be applied to a metal surface, preheated to a temperature of no less than 400° F., capable of being subjected to thermal treatment not exceeding the melting point of the metal without loss of legibility, which includes in its composition (1) an inorganic metal oxide pigment combined by fusion with a lead borosilicate ceramic flux, and (2) a cellulose ether binder.

2. A marking composition adapted to be applied to a metallic surface preheated to a temperature of no less than 400° F., and thereafter subjected to temperatures exceeding 500° F., without loss of legibility comprising (1) an inorganic metal oxide pigment combined by fusion with a lead borosilicate ceramic flux, and (2) a cellulose ether binder.

3. A marking composition adapted to be applied to a metallic surface preheated to a temperature of no less than 400° F., subjected to thermal treatment not exceeding the melting point of the metal, which includes in its composition (1) a colored frit made from a lead borosilicate flux and a metal oxide pigment and (2) a cellulose ether binder together with a softening agent for the latter, said composition being characterized by the fact that at temperatures below 500° F. the cellulose ether acts as an adhesive binder for the colored frit, and at temperatures exceeding 500° F., but below the melting point of the metal surface, the binder volatilizes and the frit fuses to the said metal surface whereby there results a permanently legible mark.

4. The composition of claim 1, in which the cellulose ether binder is ethyl cellulose.

5. The composition of claim 1, in which the cellulose ether binder is ethyl cellulose of 45-55% ethoxy content.

6. The composition of claim 1 in which the ceramic flux is a lead borosilicate, the pigment is a mixture of iron oxide and cobalt oxide, and the cellulose ether binder is medium viscosity ethyl cellulose of 45-55% ethoxy content.

WALLACE K. SCHNEIDER.
GEORGE W. SEAGREN.